(12) United States Patent
Gardner, III et al.

(10) Patent No.: US 7,996,919 B2
(45) Date of Patent: Aug. 16, 2011

(54) PROSTHETIC APPARATUS AND METHOD

(75) Inventors: James H. Gardner, III, Ambler, PA (US); Carla Armstrong, Vineland, NJ (US); Teresa Corbo, Lumberton, NJ (US)

(73) Assignee: Destination Maternity Corporation, Philadelphia, PA (US)

( * ) Notice: Subject to any disclaimer, the term of this patent is extended or adjusted under 35 U.S.C. 154(b) by 200 days.

(21) Appl. No.: 12/356,984

(22) Filed: Jan. 21, 2009
(Under 37 CFR 1.47)

(65) Prior Publication Data
US 2009/0240345 A1  Sep. 24, 2009

Related U.S. Application Data

(60) Provisional application No. 61/023,580, filed on Jan. 25, 2008.

(51) Int. Cl.
*A41D 13/00* (2006.01)
*G06B 23/28* (2006.01)

(52) U.S. Cl. ............................................. 2/69; 434/267
(58) Field of Classification Search ........ 2/69, 104–106, 2/113–115, 1; 434/262, 267, 273
See application file for complete search history.

(56) References Cited

U.S. PATENT DOCUMENTS

| 3,094,724 | A | * | 6/1963 | Lerner | 441/118 |
| 4,531,919 | A | * | 7/1985 | Ware | 434/262 |
| 7,058,439 | B2 | | 6/2006 | Eaton et al. | |
| 7,164,962 | B2 | | 1/2007 | Petterson | |

OTHER PUBLICATIONS

Maternity Pillow, pp. 1-3, http://www.mannequinco.com/maternity_pillow.htm.

* cited by examiner

*Primary Examiner* — Gloria Hale
(74) *Attorney, Agent, or Firm* — DLA Piper LLP (US)

(57) ABSTRACT

An apparatus and method for fitting a person with a maternity garment includes one or more prosthetic devices. Each prosthetic device simulates a belly enlarged by a corresponding stage of pregnancy, to be worn by a person while wearing the maternity garment to simulate the fit and appearance of the maternity garment being worn by a pregnant person.

13 Claims, 4 Drawing Sheets

PROSTHETIC APPARATUS AND METHOD

CROSS REFERENCE TO RELATED APPLICATION

This application claims the benefit of U.S. Provisional Application No. 61/023,580, filed Jan. 25, 2008.

FIELD OF THE INVENTION

The present invention relates to a prosthetic apparatus and method for fitting a person with a garment, and more particularly, a maternity garment.

BACKGROUND

Prior to the invention, an apparatus and method were unavailable to assist a customer with fitting into a maternity garment that was designed for a person to wear during a more advanced stage (trimester) of pregnancy. Thus it was difficult for the customer to evaluate the prospective fit and appearance of such a maternity garment by wearing the garment.

Existing methods and systems assist in fitting a garment to contemporaneous physical measurements of a customer. However such known methods and systems are unable to fit a garment to prospective physical measurements of the customer. Further, a known method and system are unable to fit a person to a maternity garment to be worn in a prospective stage of pregnancy.

U.S. Pat. No. 7,164,962 discloses an example of a known apparatus and method for assisting a customer with the fitting of a bra (garment). The known apparatus and method collects relevant personal information, including measurement information, to assist with the fitting process. The apparatus and method allows untrained persons to properly select and fit a bra. However, such a known apparatus and method are unable to fit a garment to future physical measurements of the customer.

U.S. Pat. No. 7,058,439 discloses that a prosthesis may be formed by forming an outer layer on a mold, and filling the mold with a polymerizable foaming composition. The mold may originate by forming a computer model of the prosthesis based on scanning dimensions of a patient. The computer model may be used to form a solid model. A prosthesis may be coupled to the patient by a retaining harness integral to the prosthesis.

SUMMARY OF THE INVENTION

According to the invention, a prosthetic apparatus is adapted to be worn by a person under a garment for fitting the person with the garment. Embodiments of the prosthetic apparatus include one or more prosthetic devices of different dimensions or sizes. An inner contour of each of the devices is shaped to conform to the belly of a person wearing the prosthetic device, while the person wears the garment over the prosthetic device to simulate the fit and appearance of the garment when worn at a future time during a more advanced stage of pregnancy.

The present invention enables a person to evaluate the fit and appearance of a maternity garment that is designed to be worn by a person during a more advanced stage of pregnancy or stage of an enlarged belly. The present invention relates to a prosthetic apparatus and method for fitting a person into a garment, and more particularly, a maternity garment, enabling the person to wear the maternity garment and evaluate the fit and appearance of the garment for purchase. Thus, the present invention allows a customer to shop for a maternity garment to be worn by the same person in the future or for the person to shop for a maternity garment to be worn by a different person, for whom the garment is intended, for example, as a gift. Moreover, the present invention enables a person to wear a maternity garment contemporaneously while simulating a more advanced stage of pregnancy.

Prior to the invention, an apparatus and method were unavailable to assist the customer with fitting into a maternity garment that was designed to be worn during a more advanced stage of pregnancy. The present invention relates to a prosthetic apparatus and method for assisting a customer with the fitting of a maternity garment, and more particularly, to an apparatus and method for fitting a person into maternity garment that is designed for wearing during a stage (trimester) of pregnancy.

BRIEF DESCRIPTION OF THE DRAWINGS

Embodiments of the invention will now be described by way of example with reference to the accompanying drawings.

DETAILED DESCRIPTION

Figure 1:
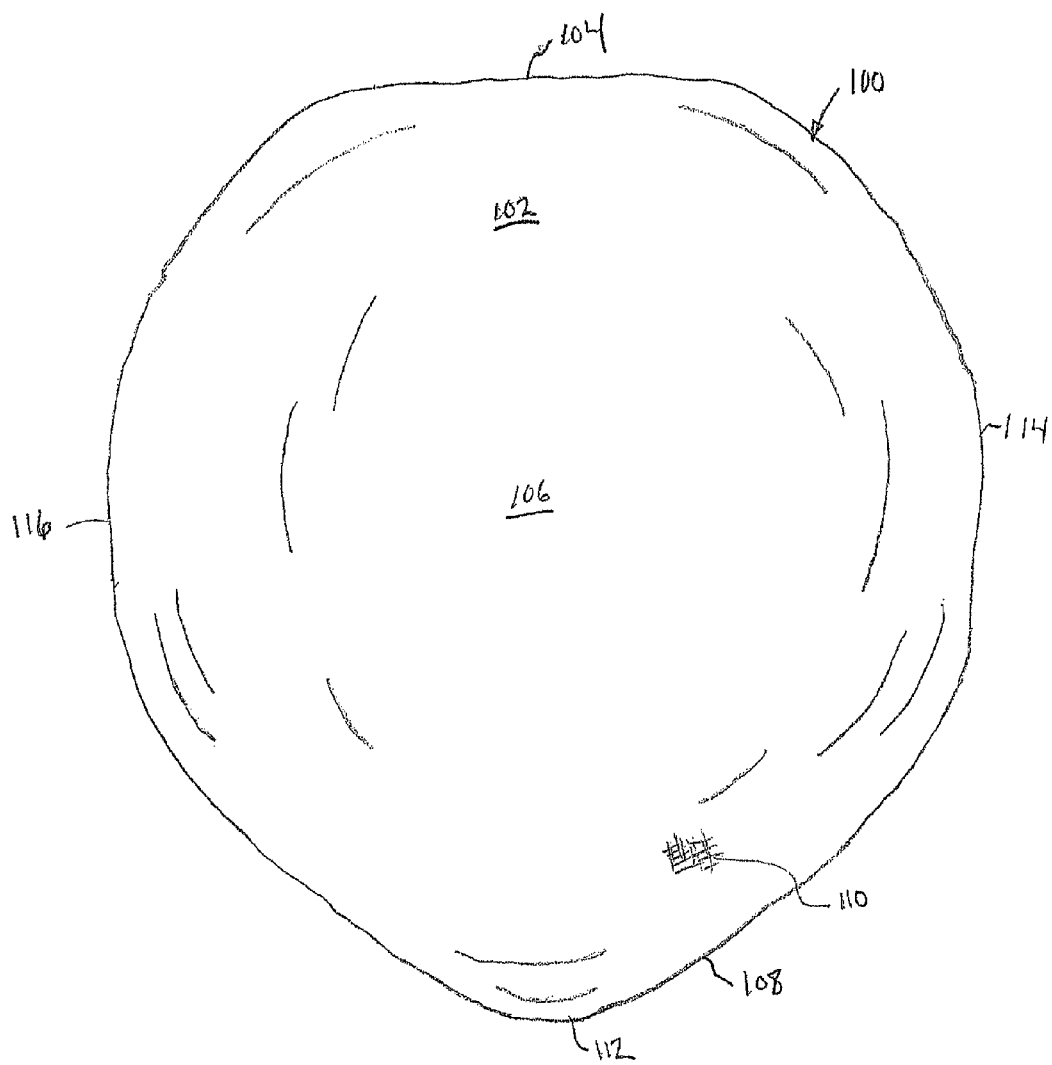
FIG. 1 is a front elevation view of a representative prosthetic device simulating a person's belly during a corresponding stage of pregnancy.

FIG. 1 discloses a prosthetic device 100 simulating the form and shape of a person's pregnant belly. The prosthetic device 100 is defined as a device externally worn by a person, which substitutes for or supplements a missing part of a person's belly to occur at a stage (trimester) of pregnancy. Different prosthetic devices 100 simulate different stages (trimesters) of pregnancy. The prosthetic device 100 is representative of one or more prosthetic devices 100, respectively, having different sizes and shapes simulating a pregnant person's belly during different stages of pregnancy. Printed matter in the form of printing or a label indicates the corresponding stage of pregnancy represented by the form and shape of an individual prosthetic device 100. For example, the prosthetic device 100 in FIG. 1 is configured, i.e. sized and shaped, to represent a human belly in the seventh month of pregnancy. According to embodiments of the invention, multiple prosthetic devices 100 representing the same stage of pregnancy are respectively configured for humans of larger or smaller, different skeletal sizes.

When viewed from the front 102, the prosthetic device 100 is generally oblate convex with a relatively broad edge at the top 104 for fitting against a person's torso approximately adjacent to and below the person's breasts approximately adjacent to the sternum. When viewed from the front 102, the prosthetic device 100 widens from the top 104 to a broader central section 106, simulating a widened belly during its corresponding prospective stage of pregnancy. Further when viewed from the front 102, the prosthetic device 100 has a tapered bottom section 108 for fitting a person's torso between upper sections of the person's hip bones. The prosthetic device 100 is fabricated of a resilient soft foam material that simulates the resiliency and soft feel of a human belly during a corresponding stage of pregnancy. The front of the prosthetic device 100 is covered with a knit or woven, fine denier, elastic fabric 110, a portion of which is shown as a small patch depicted in FIG. 1.

Figure 2:
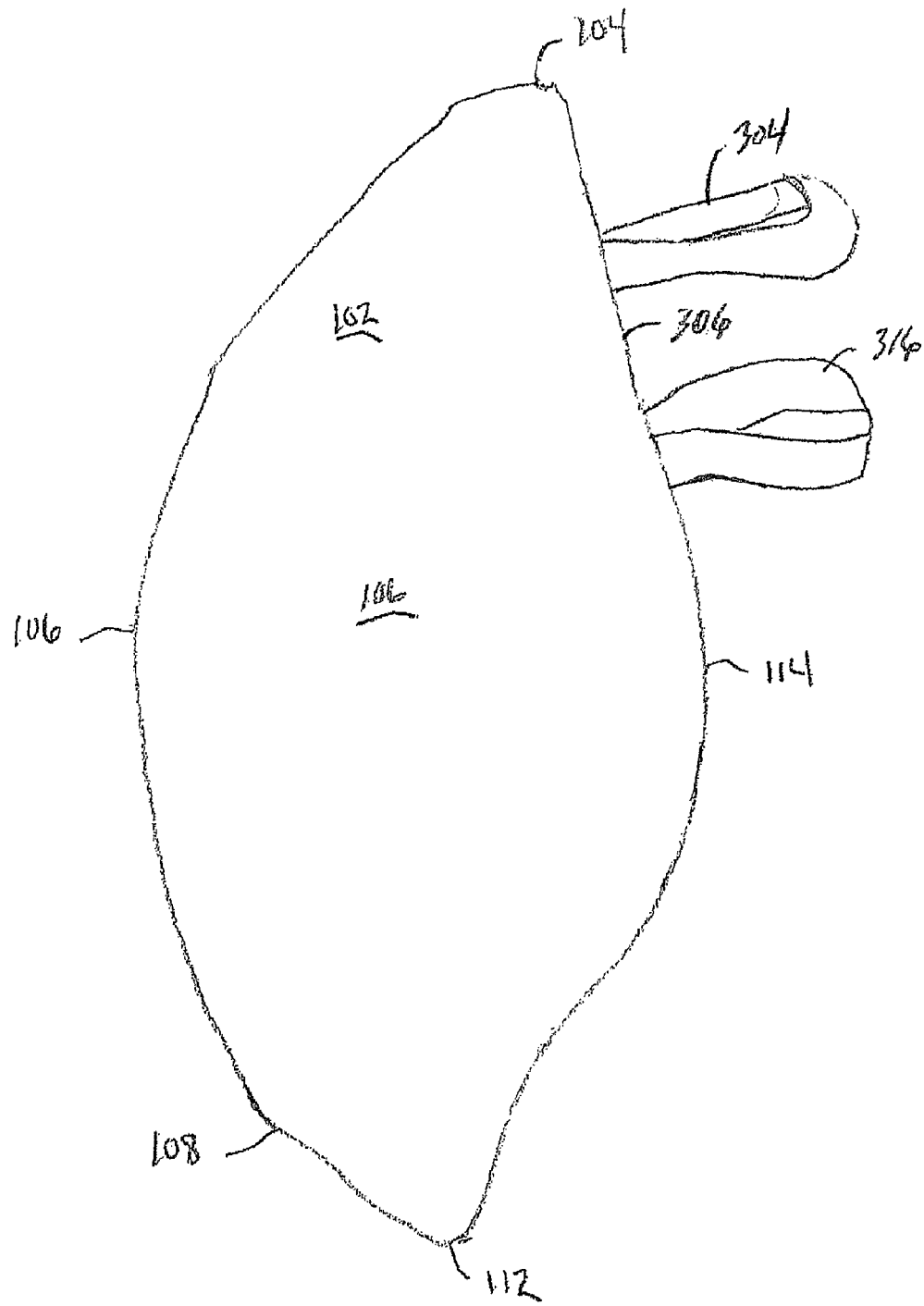
FIG. 2 is a side elevation view of the prosthetic device disclosed by FIG. 1.

FIGS. 1 and 2 depict the prosthetic device 100 of FIG. 1 shaped from top 104 to bottom 112, and from side 114 to side 116, to simulate a distended or enlarged belly during a corresponding stage of pregnancy. The prosthetic device 100 is representative of one or more prosthetic devices 100, each having a different form and shape simulating a persons belly during a different stage of pregnancy. To attain authenticity, the exterior shape of the prosthetic device 100 can be designed by a computer software program, for example, as described in U.S. Pat. No. 7,058,439, and which further determines a machine tooled shape for a manufacturing mold apparatus for forming a foam material to the desired shape of the prosthetic device 100. A computer software program and manufacturing machine form no part of the present invention.

Figure 3:
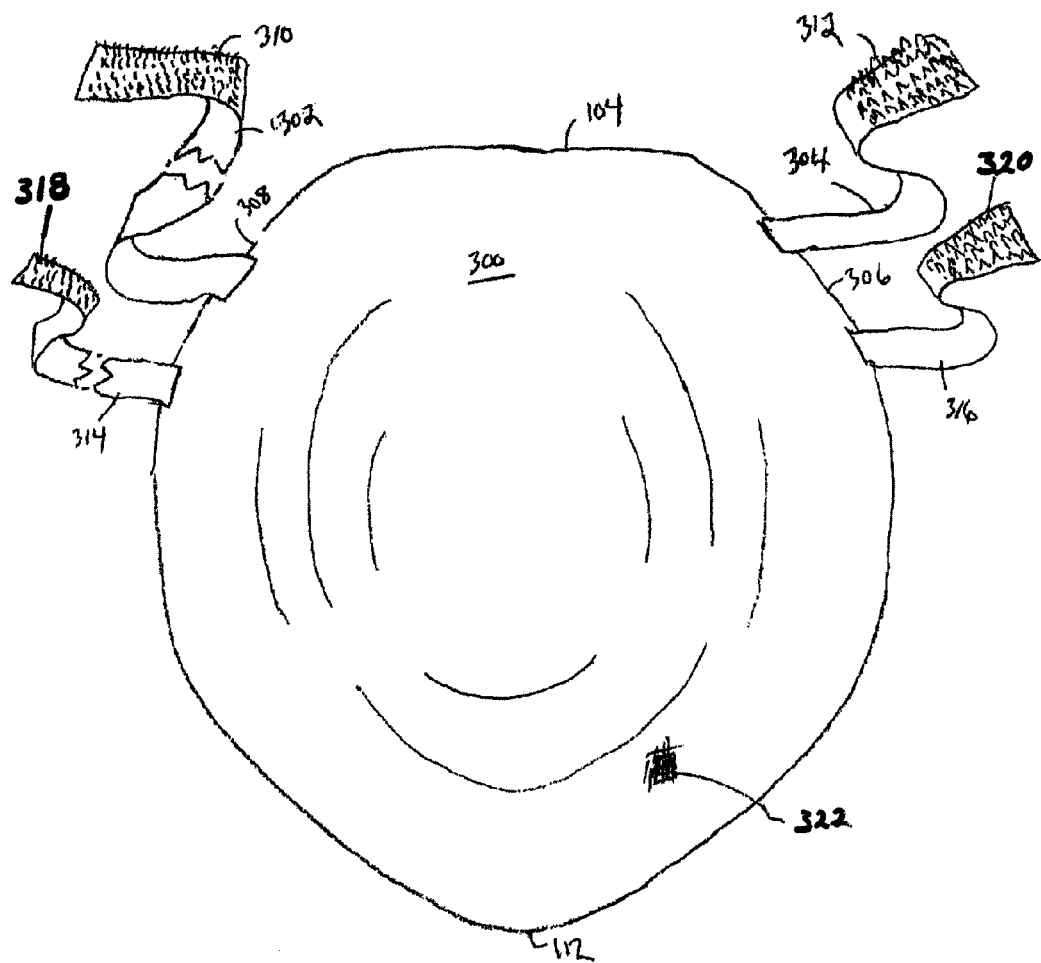
FIG. 3 is an interior or back side of the prosthetic device disclosed by FIG. 1.

FIG. 3 depicts the back 300 or inner side of the prosthetic device 100 shown in FIG. 1 to face a person wearing the device 100. With reference to FIG. 3, a first set of elongated straps 302, 304 are attached to upper tapered edges 306, 308 of the prosthetic device 100. The straps 302, 304 are fabricated of stretchable elastic material. The free ends of the straps 302, 304 are provided with a set of multiple hook and loop fasteners 310, 312 including but not limited to VEL-CRO® brand fasteners supplied by Velcro Industries B V. The respective hook and loop fasteners 310, 312 are secured together by a process of overlapping one another, and then applying pressure to snag the hook and loop fasteners 310, 312 to one another. When secured together, the hook and loop fasteners 310, 312 resist tension, and are easily disconnected by peeling them apart from one another.

With reference to FIG. 3 a second set of elongated straps 314, 316 are attached to corresponding edges 306, 308 adjacent to and above the broad central section 106 of the prosthetic device 100. The second set of elongated straps 314, 316 are similar to the first set of elongated straps 302, 304, by being fabricated of stretchable elastic material and having free ends thereof provided with another set of multiple hook and loop fasteners 318, 320. The respective hook and loop fasteners 310, 312 and 318, 320 are secured together by a process of overlapping one another, and then applying pressure to snag the hook and loop fasteners 310, 312 to one another and to snag the hook and loop fasteners 318, 320 to one another. When secured together, the hook and loop fasteners 310, 312 and 318, 320 resist tension, while being easily separated by peeling apart from one another.

With reference to FIG. 3, the back 300 or inner side is concave in shape to conform to a person's belly. For example, the back 300 or inner side is concave in shape to conform to a person's belly during a contemporaneous, early stage of pregnancy. For example, the back 300 or inner side is lined with a padded, elastic woven fabric 322 depicted by a small patch appearing in FIG. 3.

The person selects one of the prosthetic devices 100 to correspond with a belly shape simulating one of the more advanced stages of pregnancy. Each set of elongated straps 302, 304 and 314, 316 provides a coupling to at least partially encircle the torso of the person and to hold the prosthetic device 100 in place. The sets of elongated straps 302, 304 and 314, 316, respectively, are looped around the person's torso, and are adjusted in girth to hold the prosthetic device 100 in place while the maternity garment is worn over the prosthetic device 100. The sets of elongated straps 302, 304 and 314, 316, respectively, are secured together, for example, by engaging the corresponding hook and loop fasteners 310, 312 and 318, 320 or by tying the ends of the straps together.

Figure 4:
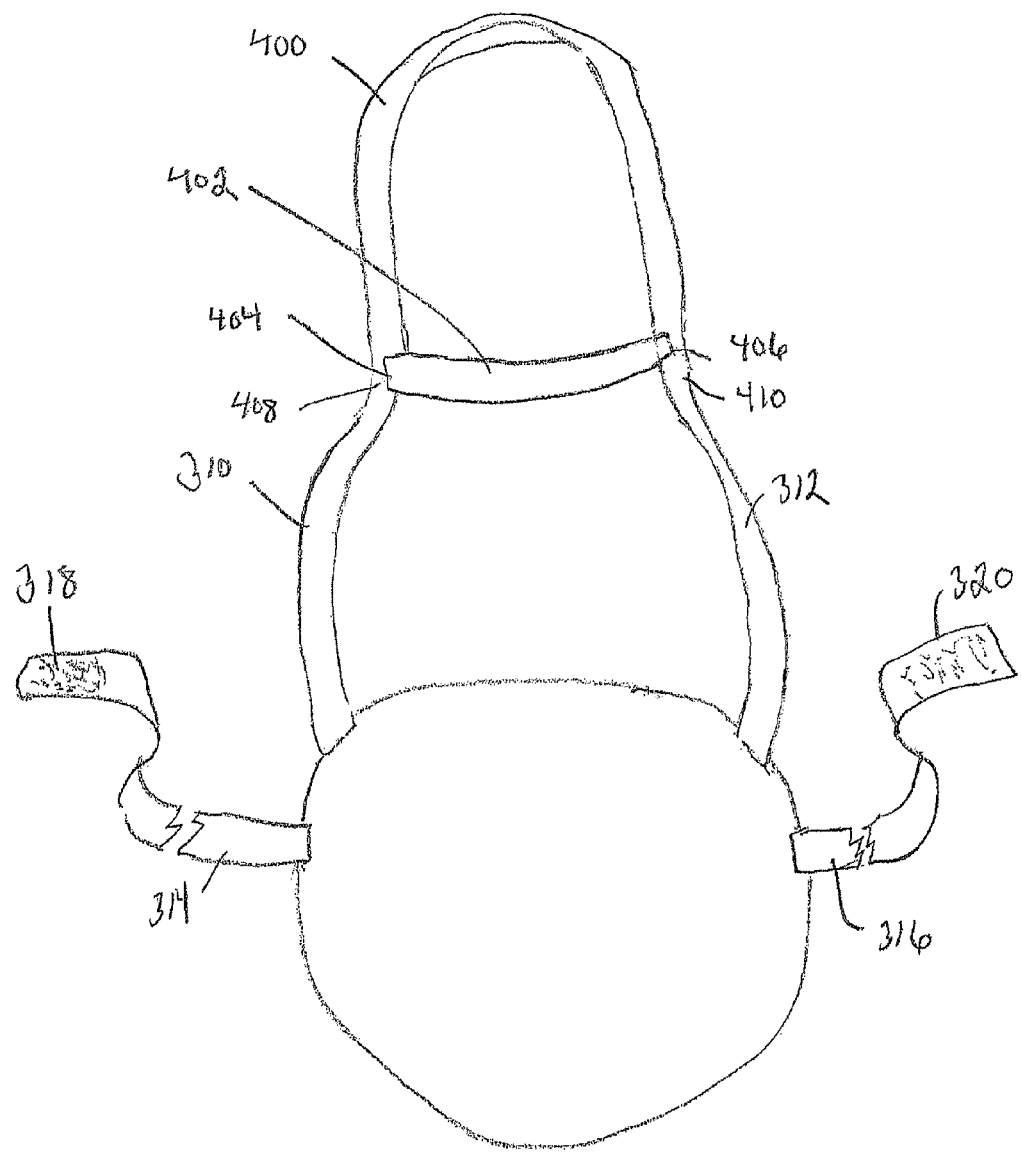
FIG. 4 is a front elevation view of an embodiment of a prosthetic device simulating a person's belly during a corresponding stage of pregnancy.

FIG. 4 discloses another embodiment of the invention depicting the prosthetic device 100 for which one of the sets of straps 302, 304 is constructed in a continuous loop 400 that extends above the described structure of the remainder of the prosthetic device 100. The prosthetic device 100 then is worn in a manner that simulates the familiar wearing of a apron, by passing the loop 400 over the wearer's head, such that the loop 400 is worn by encircling the wearer's torso behind the base of the wearer's neck. The loop 400 extends downward from behind the base of the wearer's neck to hold the prosthetic device 100 up and in proper position on the wearer's torso. According to another embodiment of the invention, the loop 400 can be restricted from wide spreading apart by adding a cross strap 402 attached at its ends 404, 406 to spaced apart sections 408, 410 of the loop 400. The cross strap 402 extends comfortably over the wearer below the wearer's neck and above the wearer's breasts. Thereby, the prosthetic device 100 is held up on the torso of the wearer. The other strap set 314 316 is looped around the torso of the wearer and is fastened by interengaging the corresponding hook and loop fasteners 318 320 or by tying the ends of the straps together.

The prosthetic device 100 is worn by the person over the person's belly while the person tries on a maternity garment to simulate the fit and appearance of the garment to be worn during a more advanced or prospective stage of pregnancy. The appearance of the garment includes, but is not limited to drapability, fabric pattern and color, and location of the neckline and hemline. Such features of an appearance are not attainable when the garment is worn in the absence of the prosthetic device 100 to substitute for or supplement missing belly dimensions. Moreover, the prosthetic device 100 is worn by the person over the person's belly contemporaneously while simulating a pregnant person who may be the same person or a different person for whom the garment is being purchased as a gift, for example. Alternatively, the person wearing the prosthetic device 100 acquires the fit and appearance of the garment that is designed to be worn by a pregnant person during a stage of pregnancy more advanced than the present time.

For example, the prosthesis is worn by a person to evaluate a maternity garment for purchase. When a customer desires to evaluate the maternity garment for purchase, the prosthesis can be worn by a person under the same or different maternity garment being evaluated for purchase. Alternatively, a different prosthesis can be worn by the person to simulate a different stage of pregnancy.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An apparatus for fitting a person with a garment, comprising:
   one or more prosthetic devices;
   an inner contour on each of the devices shaped to conform to the belly of the person;
   one or more couplings on each device for holding the respective device against the belly of the person, each coupling attached to and extending from the respective device for securing the respective device around the person's torso, wherein at least one of the one or more couplings comprises a set of adjustable elongated straps; and
   each device simulating a belly enlarged by a corresponding stage of pregnancy to fit the person into the garment to acquire a fit and appearance of the garment designed to be worn during said stage of pregnancy.

2. The apparatus of claim 1, comprising:
   the inner contour on each of the devices shaped to conform to the belly of a person shopping for the maternity garment, and enabling the person to wear one of the prosthetic devices under the garment and evaluate the fit and appearance of the garment for purchase.

3. The apparatus of claim 1, comprising:
   the inner contour on each of the devices being shaped to conform to the belly of a person shopping for the maternity garment, and enabling the person to wear one of the prosthetic devices under the garment contemporaneously while simulating a more advanced stage of pregnancy.

4. The apparatus of claim 1, wherein at least one of the one or more couplings comprises elongated straps looped around the person's torso, and secured together to hold the prosthetic device in place while the maternity garment is worn over the prosthetic device.

5. A method of using the apparatus of claim 1 for fitting a person with a garment, comprising:
   selecting one of the devices to be worn for simulating a belly enlarged by pregnancy; and
   holding the device in place against the belly of the person while the person wears the garment, enabling the person to evaluate the fit and appearance of the garment for purchase.

6. A method of using the apparatus of claim 1 for fitting a person with a maternity garment, comprising:
   selecting one of the devices to be worn for simulating a belly enlarged by pregnancy; and
   holding the device against the belly of the person with at least one of the one or more couplings on the device while a person wears the garment, enabling the person to wear the garment contemporaneously while simulating a more advanced stage of pregnancy.

7. The method of claim 6, comprising:
   using at least one of the one or more couplings on the device to hold the device against the belly of the person while the person wears the garment.

8. A method of using the apparatus of claim 1, comprising:
   wearing one of the devices by a person to evaluate a garment for purchase.

9. A method of using the apparatus of claim 1, comprising:
   wearing one of the devices by a person while wearing the same garment or a different garment for purchase to evaluate the same or different garment for purchase.

10. An apparatus for fitting a person with a garment, comprising:
    one or more prosthetic devices;
    an inner contour on each of the devices shaped to conform to the belly of the person;
    one or more couplings on each device for holding the respective device against the belly of the person, each coupling attached to and extending from the respective device for securing the respective device around the person's torso, wherein at least one of the one or more couplings comprises a continuous loop adapted to pass over the head of the person and extend downward behind the base of the person's neck; and
    each device simulating a belly enlarged by a corresponding stage of pregnancy to fit the person into the garment to acquire a fit and appearance of the garment designed to be worn during said stage of pregnancy.

11. The apparatus of claim 10, further comprising a cross strap attached at respective ends to spaced apart sections of the continuous loop, the cross strap adapted to fit below the person's neck and above the person's breasts to restrict the continuous loop from spreading apart.

12. An apparatus for fitting a person with a garment, comprising:
    one or more prosthetic devices, wherein the one or more prosthetic devices each comprise a broad edge at a top portion that widens to a broad central section that tapers to a tapered bottom section, where the top portion has tapered edges extending from the broad edge;
    an inner contour on each of the devices shaped to conform to the belly of the person;
    one or more couplings on each device for holding the respective device against the belly of the person, each coupling attached to and extending from the respective device for securing the respective device around the person's torso; and
    each device simulating a belly enlarged by a corresponding stage of pregnancy to fit the person into the garment to acquire a fit and appearance of the garment designed to be worn during said stage of pregnancy.

13. The apparatus of claim 12, wherein a first of the one or more couplings comprises a first set of elongated straps attached to an upper section of the tapered edges of the top portion, and wherein a second of the one or more couplings comprises a second set of elongated straps attached above the broad central section.

* * * * *